United States Patent [19]

Just

[11] Patent Number: 5,356,607

[45] Date of Patent: Oct. 18, 1994

[54] PROCESS FOR THE HYDROTHERMAL PRODUCTION OF CRYSTALLINE SODIUM DISILICATE

[75] Inventor: Guenther Just, Hilden, Fed. Rep. of Germany

[73] Assignee: Henkel Kommanditgesellschaft auf Aktien, Duesseldorf, Fed. Rep. of Germany

[21] Appl. No.: 852,249

[22] Filed: Jun. 2, 1992

[30] Foreign Application Priority Data

Dec. 2, 1989 [DE] Fed. Rep. of Germany ....... 3939919

[51] Int. Cl.⁵ ............................................. C01B 33/32
[52] U.S. Cl. .................................... 423/334; 252/135
[58] Field of Search .................. 423/332, 334; 252/135

[56] References Cited

U.S. PATENT DOCUMENTS

| | | | |
|---|---|---|---|
| 2,881,049 | 4/1959 | Erbe et al. | 23/110 |
| 3,537,815 | 11/1970 | Burke | 423/334 |
| 4,336,235 | 6/1982 | Deabriges | 423/332 |
| 4,770,866 | 9/1988 | Christophliemk | 423/334 |

FOREIGN PATENT DOCUMENTS

| | | |
|---|---|---|
| 0306828 | 3/1989 | European Pat. Off. ............ 423/332 |
| 0320770 | 6/1989 | European Pat. Off. . |
| 2549167 | 11/1975 | Fed. Rep. of Germany . |
| 3100942 | 7/1982 | Fed. Rep. of Germany . |
| 3417649 | 11/1985 | Fed. Rep. of Germany . |
| 3423945 | 1/1986 | Fed. Rep. of Germany ...... 423/334 |

OTHER PUBLICATIONS

Benecke & Lagaly, American Minerals, 62, 1977, pp. 763–771.

*Primary Examiner*—Olik Chaudhuri
*Assistant Examiner*—Ken Horton
*Attorney, Agent, or Firm*—Ernest G. Szoke; Wayne C. Jaeschke; Norvell E. Wisdom, Jr.

[57] ABSTRACT

This invention is a process for the hydrothermal preparation of sodium disilicate with a molar ratio of $Na_2O:SiO_2$ of 1:2 at an elevated temperature and a pressure corresponding to said temperature in a pressure vessel, characterized in that quartz sand and caustic soda solution and/or an aqueous solution of amorphous sodium disilicate at a total solids concentration of from 50 to 75% by weight are heated to at least 235° C. in a first step, the concentration may be increased in an optional second step by removing water from the reaction mixture, in a third step, dependent on whether the second step has been carried out, the amount of water removed in the second step is completely or partially added again to the mixture during or immediately after same has been cooled to from 90° C. to 130° C., and then the obtained crystalline sodium disilicate is recovered.

20 Claims, No Drawings

PROCESS FOR THE HYDROTHERMAL PRODUCTION OF CRYSTALLINE SODIUM DISILICATE

BACKGROUND OF THE INVENTION

1. Field of the Invention

The invention relates to a process for the hydrothermal preparation of crystalline sodium disilicate from quartz sand and caustic soda solution and/or from aqueous solutions of amorphous sodium disilicate.

2. Statement of Related Art

The preparation of crystalline sodium salts of silicic acids with a $SiO_2/Na_2O$ ratio of from 2:1 to 3:1 is usually effected by annealing sodium silicate glasses or by heating sodium carbonate and quartz (DE-OS 31 00 942).

Willgallis and Range (*Glastechnische Berichte* [*Glass Technology Reports*] 37 (1964), 194–200) describe the preparation of α-, β- and γ-$Na_2Si_2O_5$ by annealing melted and unmelted dehydrated soda water glass. These products have a layer structure. That they comprise crystalline forms is evident from the X-ray diffraction spectra. The authors show that various crystal forms are obtained, dependent on the temperature.

Benecke and Lagaly, in *Am. Mineral.* 62 (1977), 763–771, describe a process for the preparation of a hydrated crystalline sodium silicate having a kanemite structure (approximately conforming to the composition of $NaHSi_2O_5$). In said process, in a first step $SiO_2$ is dispersed in methanol, and cold caustic soda solution is added thereto. This process is expensive because of the controlled addition of the individual substances and requires particular safety precautions because of the use of flammable methanol.

In DE-OS 34 17 649 there has been described a process wherein a hydrated sodium silicate is admixed with crystal nuclei, the reaction mixture is dehydrated by heating, and the dehydrated mixture is maintained at a temperature which is at least 450° C., but is below the melting point thereof, until the crystalline sodium silicate having a layer structure has been formed.

Upon the dehydration (upon evaporation) of water glass solutions or of solutions of conventional sodium silicates (having no layer structure) with a molar ratio of $SiO_2/Na_2O$ of from 1.9:1 to 3.5:1, amorphous products are obtained. It is only at temperatures in excess of 450° C. and in the course of several hours that these products will crystallize in the presence of an aqueous phase (DE-OS 34 17 649). In general, several hours are required for this reaction. At temperatures of between 600° C. and 850° C., minutes, and for certain silicates even fractions of a minute, occasionally may be sufficient.

EP-A 0 320 770 describes a process for the preparation of an X-ray crystalline sodium disilicate (sodium silicate having a layer structure) by dissolution in water of an X-ray crystalline layer silicate and subsequent evaporation at an elevated temperature. This process already employs a crystalline sodium layer silicate as the starting material and has been specifically directed to the production of sodium disilicate-containing washing and cleaning agents. Said printed publication only describes a mode of processing a crystalline sodium disilicate by dissolving same in water and subsequently evaporating the water, which crystalline sodium disilicate, however, primarily has been obtained by other methods.

Likewise it has been known to one of ordinary skill in the art that the dissolution of amorphous sodium disilicate in water and subsequent evaporation again results in the formation of an amorphous sodium disilicate.

According to prior art it has not been possible so far to directly produce a crystalline sodium disilicate of a high purity by a hydrothermal route in a commercially realizable mode.

J. Franke (*Bull. Soc. Chim.* 950, p. 454 et seq.) describes attempts for a hydrothermal preparation of sodium disilicate. For recovering the reaction product from quartz and a sodium hydroxide solution, it was attempted in expensive apparatuses, in part by using crystallization nuclei, to induce crystallization of the reaction product. Then the obtained reaction products were allowed to crystallize for several weeks with cooling, whereby mixtures comprising amorphous and crystalline sodium disilicate were frequently obtained.

DESCRIPTION OF THE INVENTION

Object of the Invention

Now there is the object to provide a simple process which allows preparing a crystalline highly pure sodium disilicate in one step by employing quartz sand and a sodium hydroxide solution and/or aqueous solutions of amorphous sodium disilicate.

SUMMARY OF THE INVENTION

It was now surprisingly found that solid crystalline and highly pure sodium disilicate is formed in the hydrothermal reaction of quartz sand and caustic soda solution and/or aqueous solutions of amorphous sodium disilicate, if limited conditions of concentration and temperature are maintained.

According to the invention, the above object was attained by a process for the hydrothermal preparation of crystalline sodium disilicate having a molar ratio of $Na_2O:SiO_2$ of 1:2 at an elevated temperature and a pressure corresponding to said temperature in a pressure vessel, characterized in that quartz sand and caustic soda solution and/or an aqueous solution of amorphous sodium disilicate at a total solids concentration of from 50 to 75% by weight are heated to at least 235° C. in a first step, the concentration may be increased in an optional second step by removing water from the reaction mixture, in a third step, dependent on whether the second step will have been carried out, the amount of water removed in the second step is completely or partially added again to the mixture during or immediately after same has been cooled to from 90° C. to 130° C., and then the obtained crystalline sodium disilicate is recovered.

The lower limit for the total solids concentration is 50% by weight. The total solids concentration is understood to mean the percentage of the solids $SiO_2$ and $Na_2O$ (calculated from NaOH) altogether employed, in the case of aqueous solutions of amorphous disilicate the proportion contained therein of solid, or in mixtures of quartz sand, sodium hydroxide and aqueous solutions of amorphous sodium disilicate the sum of all of the solids contained therein.

This is a concentration range in which, upon cooling, normally highly viscous masses are encountered which are hardly fluid any more and are difficult to handle. Due to the precipitation in the course of the reaction of considerable amounts of crystalline sodium disilicate, the concentration in the solution is reduced. Such a suspension is still capable of being handled and filtered.

DESCRIPTION OF PREFERRED EMBODIMENTS

The upper limit of the total solids concentration of 75% by weight is virtually determined by the limits of processability. Total solids concentrations of practical importance of the employed mixtures or solutions are especially those ranging from 60 to 70% by weight. At total solids concentrations in excess of 75% by weight, although the yield of crystalline sodium silicate further increases, material buildup on the walls of the vessel will simultaneously occur in an increasing amount, which can be avoided only by a particular apparatus design.

The first process step conforms to a digestion reaction which is carried out at a temperature of at least 235° C. in a pressure vessel (autoclave). The reaction time required for a quantitative conversion at that temperature is from 2 to 3 hours. An about 99% conversion of quartz sand can be already obtained after a reaction time of 30 minutes. According to the invention, conversion degrees of 99.9% are attainable.

It is generally applicable that the reaction time will be reduced upon an increase in the reaction temperature; however, to keep the process technology expenses within reasonable limits, the reaction temperature feasibly is between 235° C. and 300° C., and especially between 250° C. and 280° C. Nevertheless, the reaction always may also be carried out at a reaction temperature above 300° C. More specifically, this is of interest, if short reaction times are intended to be realized, as is the case for a continuous process operation.

The average yield of crystalline sodium disilicate, considered in one isolated batch, is 50 to 60% of the employed total amount of solids. The remainder is substantially present as amorphous sodium disilicate in dissolved form and is obtained in the filtrate upon filtration. Said filtrate may be recycled into the process, optionally after it has been re-concentrated to the required concentration range, unless there are other intended uses (Example 3). Here again attention is to be paid, so that a total solids concentration of at least 50% by weight of the resulting mixture will be maintained. The desired concentration may optionally be adjusted by removing the calculated amount of water when the mixture is heated to the reaction temperature. The yield of crystalline sodium disilicate obtained from such mixtures comprising recycled solutions of amorphous sodium disilicate, quartz sand and caustic soda solution also amounts to 50 to 60%. Thus, a complete conversion into a crystalline product will take place little by little.

The same ranges as indicated above for the temperatures and concentrations are likewise applicable to the use of aqueous solutions of amorphous sodium disilicate. If necessary, the solution is to be re-concentrated in order to meet the concentration requirements. However, much less time is needed than for the digestion of quartz, while the yield of crystalline sodium disilicate is somewhat lower, amounting to about 45%. However, it may be increased by the addition of crystalline sodium disilicate as seed material and then will amount to about 50%. This mode of operation is particularly well suitable for a continuous process.

According to the invention, the process may be conducted also in such a manner that the total solids concentration is increased in a second step, directly following the first step, by removing water from the reaction mixture. The amount of water discharged as steam from the reaction vessel is condensed and may be completely or partially re-supplied to the reaction mixture in a third step at some later time. This third step is carried out, as a rule, during or immediately after cooling. The re-concentration step causes the total solids concentration to increase by another 5 to 10% by weight, whereby a further increase in the yield of the crystalline sodium disilicate 30 to more than 60% is achieved.

The reaction mixture may also be subjected to a concentration increase already while it is heated to the reaction temperature. This may be of interest, if the total solids concentrations of the starting mixtures are low (Examples 3 and 4).

Prior to the work-up, however, during or immediately after cooling, when the reaction mixture has a temperature between 90° C. and 130° C., the amount of water as previously removed is returned thereto, so that the mixture will be easy to handle again.

The further work-up comprises separating the crystal-line sodium disilicate from the mother liquor, especially by filtration at a temperature between 100° C. and 130° C. To this end, heated filter presses or pressurized suction filters have proven to be useful, wherein the filtration through an alkali-resistant filter cloth is preferably effected at from 2 to 3 bar. It is expedient to displace residues of the solution by flushing with steam of 2 bar. The obtained filter cake still has a water content of about 15% by weight. After size reduction of the filter residue, the water content may be reduced to about 2% by weight, for example by a treatment with hot air in a vortex drier. The drying step may be followed by grinding and/or sifting.

The crystalline sodium disilicate thus obtained has a purity in excess of 95% and consists of the $\beta$-form (low temperature form) as has been shown by X-ray diffraction diagrams.

The process is further illustrated by, without being limited to, the following examples.

EXAMPLE 1

The hydrothermal synthesis and conversion into crystalline material was carried out in a nickel-clad stirred autoclave having a total capacity of 5 liters and being operable up to 350° C. and 300 bar, equipped with an anchor agitator and electric heater.

The autoclave was charged with 1.6 kg of caustic soda solution (50% by weight), 0.52 kg of water and 1.2 kg of quartz sand (particle size from 0.1 to 0.7 mm) and heated to 250° C. After a period of reaction of 2 hours it was cooled, and the contents were discharged from the autoclave at about 100° C. The product was a medium-viscosity suspension of fine particles and had a solids content of 60%. In order to recover the constituent of crystalline sodium disilicate, the product was filtered through a heated pressurized suction filter provided with a low-porosity polypropylene cloth at 2 to 3 bar, followed by flushing with steam of 2 bar to remove adherent solution. The obtained filter cake comprising a water content of about 15% by weight was then comminuted and in this form dried with hot air to a water content of about 2% by weight. Subsequent grinding and sifting yielded 0.98 kg of crystalline sodium disilicate as the final product. According to the X-ray diffraction diagram, said product is pure crystalline sodium disilicate of the $\beta$-form. The yield of crystalline product was 51%. The resulting mother liquor weighed 1.98 kg and contained 0.88 kg of amorphous disilicate, corresponding to a solids content of 45% by weight.

EXAMPLE 2

The apparatus of Example 1 was charged with 1.6 kg of caustic soda solution (50% by weight) and 1.2 kg of quartz sand, heated to 250° C. and maintained at that temperature for 2 hours. Prior to cooling, 0.2 kg of water was distilled off, whereby the total solids concentration was increased to 70% by weight from 65% by weight. After cooling to about 100° C., 0.2 kg of water were returned into the batch; this was followed by the work-up. A yield of crystalline sodium disilicate of 58% was obtained.

EXAMPLE 3

The apparatus of Example 1 was charged with 1.9 kg of mother liquor (45% by weight of solids content of amorphous sodium disilicate), 0.85 kg of caustic soda solution (50% by weight) and 0.64 kg of quartz sand. While the mixture was heated to 250° C., 0.6 kg of water were distilled off. After 2 hours of reaction time, the batch was cooled and worked up as described in Example 1. The yield of crystalline product was 55%.

EXAMPLE 4

The apparatus of Example 1 was charged with 3.5 kg of a 50% by weight aqueous solution of amorphous sodium disilicate. While the mixture was heated to 250° C., 0.8 kg was distilled off. After 20 minutes of reaction time, the batch was cooled and worked up as described in Example 1. The yield of crystalline product was 44%.

I claim:

1. A process for the hydrothermal preparation of solid, crystalline, sodium disilicate with a purity in excess of 95% in the β-form, with a molar ratio of $Na_2O:SiO_2$ of 1:2, wherein:
   (A) quartz sand, caustic soda solution, and, optionally, an aqueous solution of amorphous sodium disilicate, in a molar ratio of $Na_2O:SiO_2$ that corresponds to the composition of the desired final product and with a total solids concentration of from 50 to 75% by weight, are heated to a reaction temperature of at least 235° C. in a pressure vessel; and, optionally,
   (B) the concentration of the reaction mixture formed in step (A) is increased by removing water from the reaction mixture; and, if step (B) has been performed,
   (C) at least part of the amount of water removed in step (B) is added to the mixture formed in step (B) during or immediately after it has been cooled to from 90° C. to 130° C.; and
   (D) the obtained crystalline sodium disilicate is recovered.

2. A process according to claim 1, wherein the total solids concentration is from 60 to 70% by weight.

3. A process according to claim 2, wherein the reaction temperature is between 250° C. and 280° C.

4. A process according to claim 3, wherein an aqueous solution of amorphous sodium disilicate that consists of the mother liquor obtained upon the recovery of the crystalline sodium disilicate is recycled to step (A) of a repetition of the process.

5. A process according to claim 4, wherein step (B) is included and is effected during the heating of the reaction mixture.

6. A process according to claim 2, wherein the reaction temperature is between 235° C. and 300° C.

7. A process according to claim 1, wherein the reaction temperature is between 235° C. and 300° C.

8. A process according to claim 7, wherein the reaction temperature is between 250° C. and 280° C.

9. A process according to claim 8, wherein an aqueous solution of amorphous sodium disilicate that consists of the mother liquor obtained upon the recovery of the crystalline sodium disilicate is recycled to step (A) of a repetition of the process.

10. A process according to claim 7, wherein an aqueous solution of amorphous sodium disilicate that consists of the mother liquor obtained upon the recovery of the crystalline sodium disilicate is recycled to step (A) of a repetition of the process.

11. A process according to claim 6, wherein an aqueous solution of amorphous sodium disilicate that consists of the mother liquor obtained upon the recovery of the crystalline sodium disilicate is recycled to step (A) of a repetition of the process.

12. A process according to claim 5, wherein an aqueous solution of amorphous sodium disilicate that consists of the mother liquor obtained upon the recovery of the crystalline sodium disilicate is recycled to step (A) of a repetition of the process.

13. A process according to claim 4, wherein an aqueous solution of amorphous sodium disilicate that consists of the mother liquor obtained upon the recovery of the crystalline sodium disilicate is recycled to step (A) of a repetition of the process.

14. A process according to claim 2, wherein an aqueous solution of amorphous sodium disilicate that consists of the mother liquor obtained upon the recovery of the crystalline sodium disilicate is recycled to step (A) of a repetition of the process.

15. A process according to claim 1, wherein an aqueous solution of amorphous sodium disilicate that consists of the mother liquor obtained upon the recovery of the crystalline sodium disilicate is recycled to step (A) of a repetition of the process.

16. A process according to claim 15, wherein step (B) is included and is effected during the heating of the reaction mixture.

17. A process according to claim 14, wherein step (B) is included and is effected during the heating of the reaction mixture.

18. A process according to claim 3, wherein step (B) is included and is effected during the heating of the reaction mixture.

19. A process according to claim 2, wherein step (B) is included and is effected during the heating of the reaction mixture.

20. A process according to claim 1, wherein step (B) is included and is effected during the heating of the reaction mixture.

* * * * *

UNITED STATES PATENT AND TRADEMARK OFFICE
CERTIFICATE OF CORRECTION

PATENT NO. : 5,356,607
DATED : October 18, 1994
INVENTOR(S) : Just

It is certified that error appears in the above-indentified patent and that said Letters Patent is hereby corrected as shown below:

On title page,"[22] filed: Jun. 2, 1992", should read:
-- [22] PCT filed: Nov. 23, 1990 --.

On title page, after section [22], section [86] should be inserted and should read:
-- [86] PCT No.: PCT/EP90/02006
       371 Date: Jun. 2, 1992
       102(e) Date: Jun. 2, 1992 --.

On title page, after section [86], section [87] should be inserted and should read:
-- [87] PCT Pub. No.: WO91/08171
       PCT Pub. Date: Jun. 13, 1991 --.

Signed and Sealed this

Twenty-fifth Day of July, 1995

Attest:

BRUCE LEHMAN

*Attesting Officer*     *Commissioner of Patents and Trademarks*